Jan. 4, 1966 J. L. CHRISTMANN 3,227,232
LOW CAPACITY WEIGHER AND FEEDER
Filed March 10, 1964 6 Sheets-Sheet 1

INVENTOR
J.L.CHRISTMANN
BY John A. Seifert
ATTORNEY

Jan. 4, 1966  J. L. CHRISTMANN  3,227,232
LOW CAPACITY WEIGHER AND FEEDER
Filed March 10, 1964  6 Sheets-Sheet 2

INVENTOR
J. L. CHRISTMANN
BY John A. Seifert
ATTORNEY

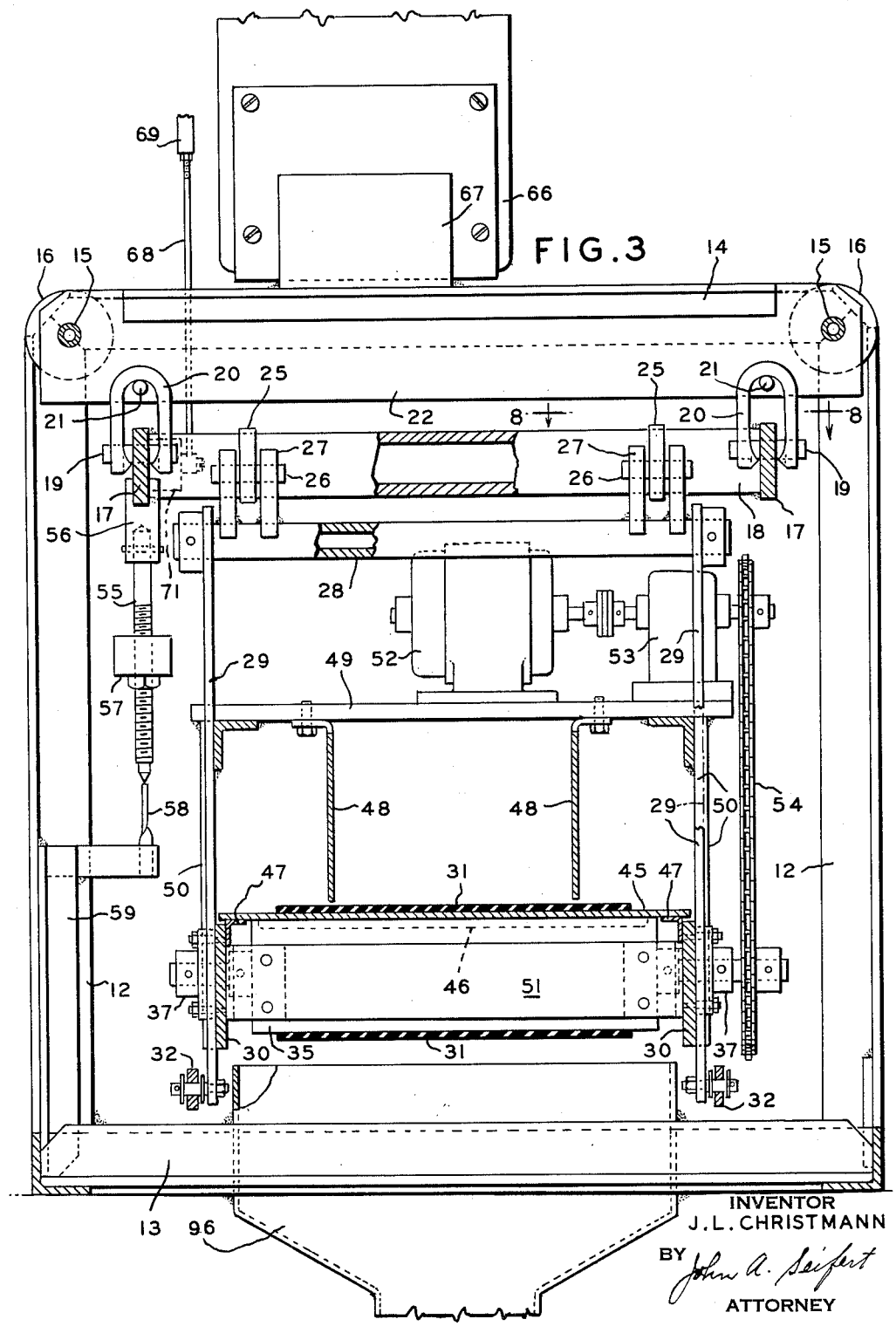

Jan. 4, 1966  J. L. CHRISTMANN  3,227,232
LOW CAPACITY WEIGHER AND FEEDER
Filed March 10, 1964  6 Sheets-Sheet 4
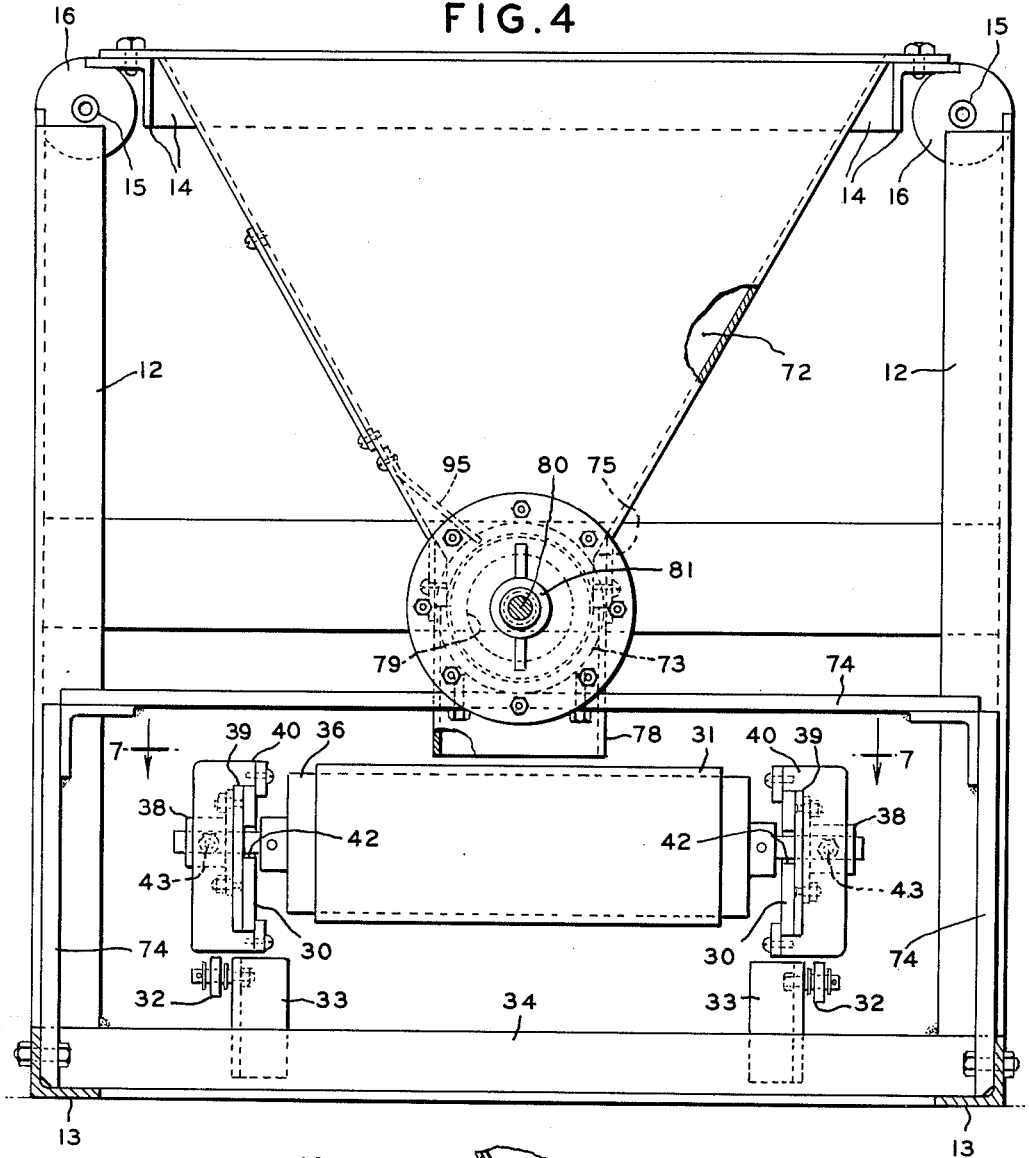
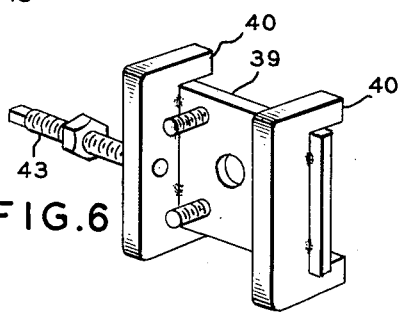
INVENTOR
J. L. CHRISTMANN
BY John A. Seifert
ATTORNEY

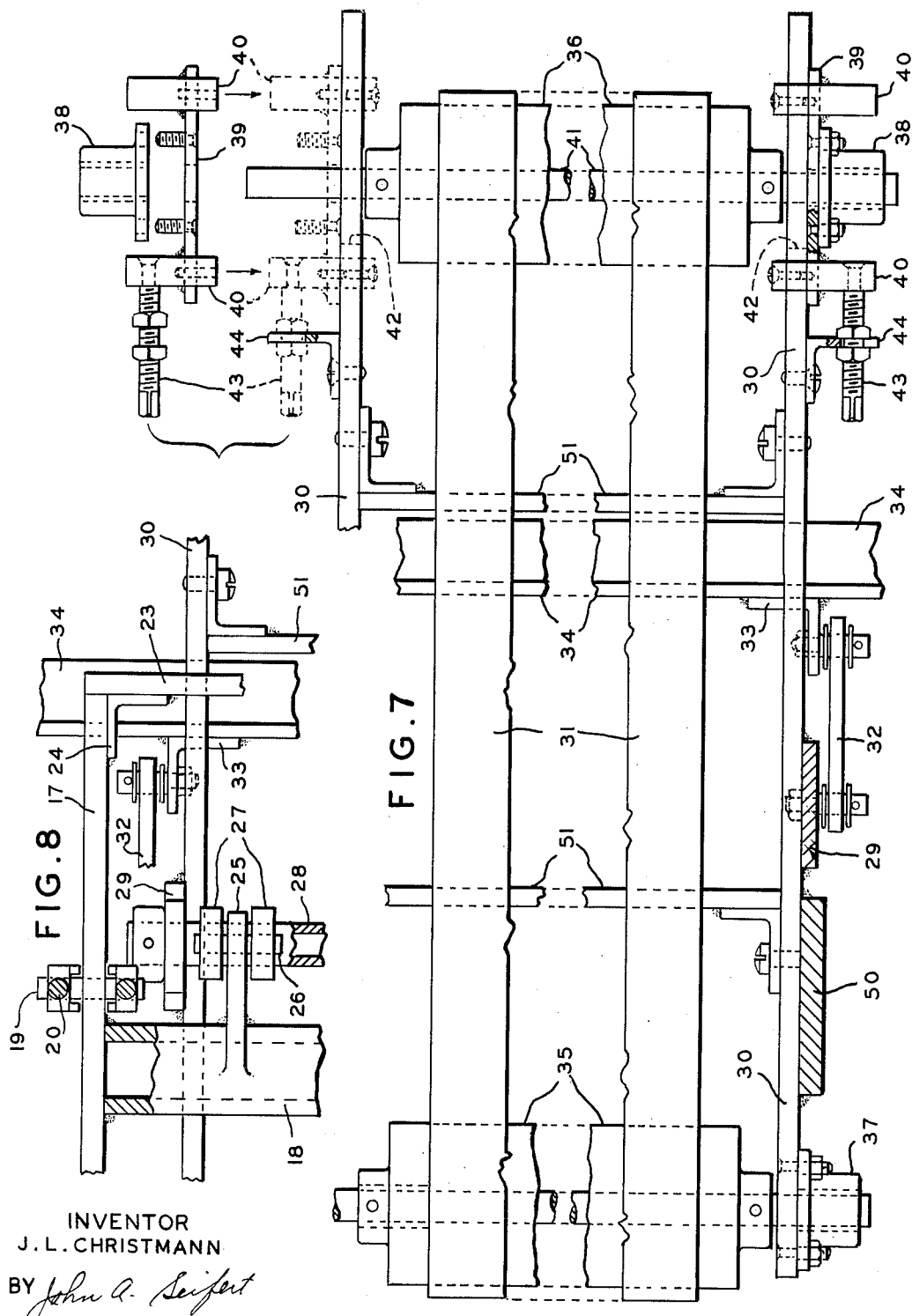

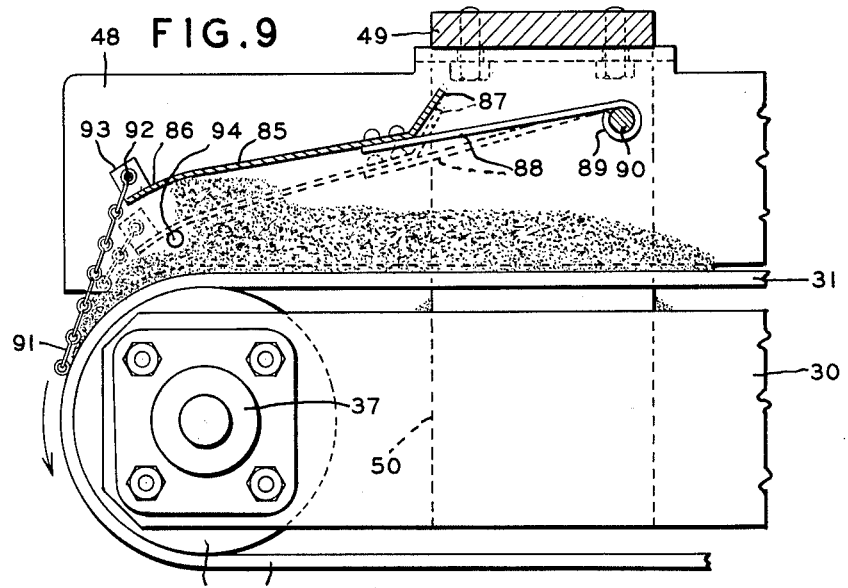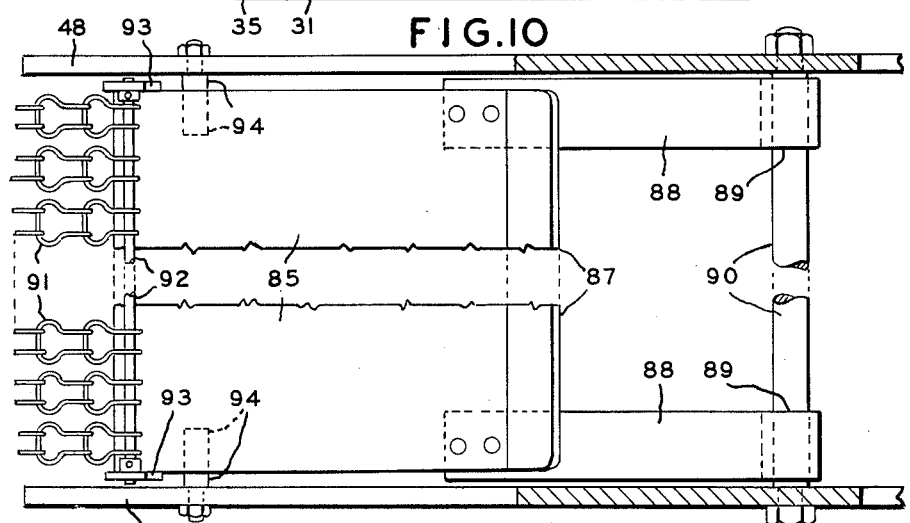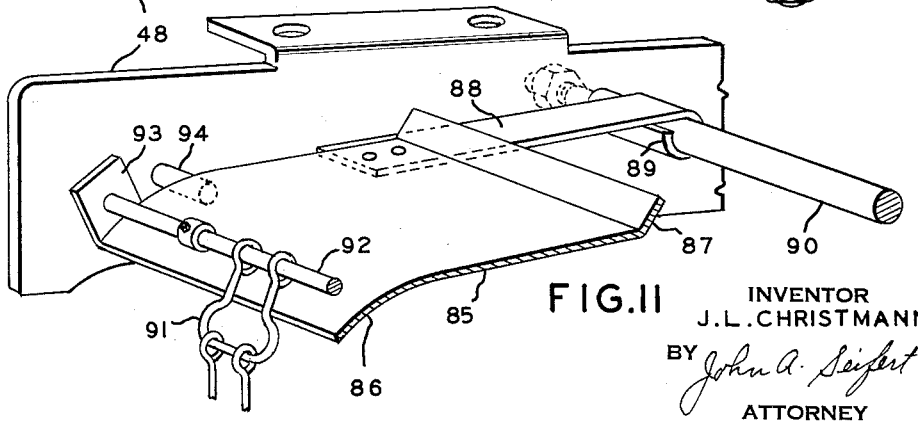

United States Patent Office 3,227,232
Patented Jan. 4, 1966

3,227,232
LOW CAPACITY WEIGHER AND FEEDER
John L. Christmann, Passaic County, N.J., assignor to Merrick Scale Mfg. Company, Passaic, N.J., a corporation of New Jersey
Filed Mar. 10, 1964, Ser. No. 350,740
8 Claims. (Cl. 177—16)

This invention relates to a low capacity weigher and feeder to handle mostly fine or granular materials, and particularly to a weigher and feeder having a capacity range of between one hundred pounds per hour and ten thousand pounds per hour.

It is an object of the invention to provide a unit consisting of a prefeeder, which may be either a spiral, a screw or a belt feeder, and a weighing conveyor entirely suspended from a combination main lever and beam with a pendulum and an adjustable weight on the pendulum for a deflection proportional to the load on the conveyor.

The advantage of suspending the entire weighing conveyor is the elimination of the conveyor belt tension and alignment problems, and the sensing of very low loads.

Another advantage of suspending the entire weighing conveyor from the lever, which is also used as the load sensing element by the addition of the pendulum and the adjustable weight on the pendulum, simplifies the suspension system and reduces it to one combination lever and beam.

A further advantage of suspending the entire weighing conveyor produces a small vertical deflection under load, which is less than one-sixteenth of an inch, and therefore does not affect accuracy.

Another advantage of suspending the entire weighing conveyor is that the length of the conveyor can be kept very short, since low loads can be sensed due to a minimum of pivots required and the considerable reduction in friction.

On many previous combined feeders and weighers, only part of the weigher conveyor length is suspended for weighing. An approach-retreat sections suspension is used with fulcrums at both ends and the center of both sections connected to a load sensing system or only one section is used with one end of said section fulcrumed and the other end of said section suspended from a load sensing system. In such an approach-retreat sections suspension, the conveyor belt tension influences the weighing accuracy considerably, especially when very light loads are being fed and weighed. To reduce this adverse effect, a very thin conveyor belt is used to flex readily and the conveyor belt tension is maintained at a minimum. The disadvantages of a thin conveyor belt are that it has a limited life and the low conveyor belt tension causes slippage. To prevent slippage, the conveyor belt has to be positively driven, for instance by the use of a timing belt attached to the conveyor belt.

In the use of the present invention, the belt tension has no influence on the load sensing and a heavier conveyor belt can be used thereby preventing premature wear and obviating the use of special belts and a sufficient conveyor belt tension can be applied to prevent slippage.

A further object of the invention is to provide means to stabilize the material break-off at the head pulley or discharge end of the conveyor to avoid weighing errors with varying depths of load.

Further objects and advantages of the invention will be set forth in the detailed description of the invention.

In the drawings accompanying and forming a part of this application:

FIGURE 3 is a sectional view taken on the line 3—3 of FIGURE 1 looking in the direction of the arrows;

FIGURE 4 is an end view looking at the right hand side of FIGURE 2;

FIGURE 5 is a fragmentary sectional view taken on the line 5—5 of FIGURE 2 looking in the direction of the arrows to show the arrangement of a baffle in a material hopper in conjunction with the feeder;

FIGURE 6 is a perspective view of an adjustable bearing for a pulley of the conveyor belt at the material receiving portion of said conveyor belt;

FIGURE 7 is a plan view looking from the line 7—7 of FIGURE 4 looking in the direction of the arrows;

FIGURE 8 is a fragmentary sectional view taken on the line 8—8 of FIGURE 3 looking in the direction of the arrows;

FIGURE 9 is a fragmentary elevational view of the material discharge portion of the conveyor belt showing means to stabilize the material break-off at the head pulley;

FIGURE 10 is a plan view of the material discharge portion of the conveyor belt and the stabilizing means shown in FIGURE 9; and FIGURE 11 is a perspective view of the stabilizing means partly shown in section.

Figure 1:
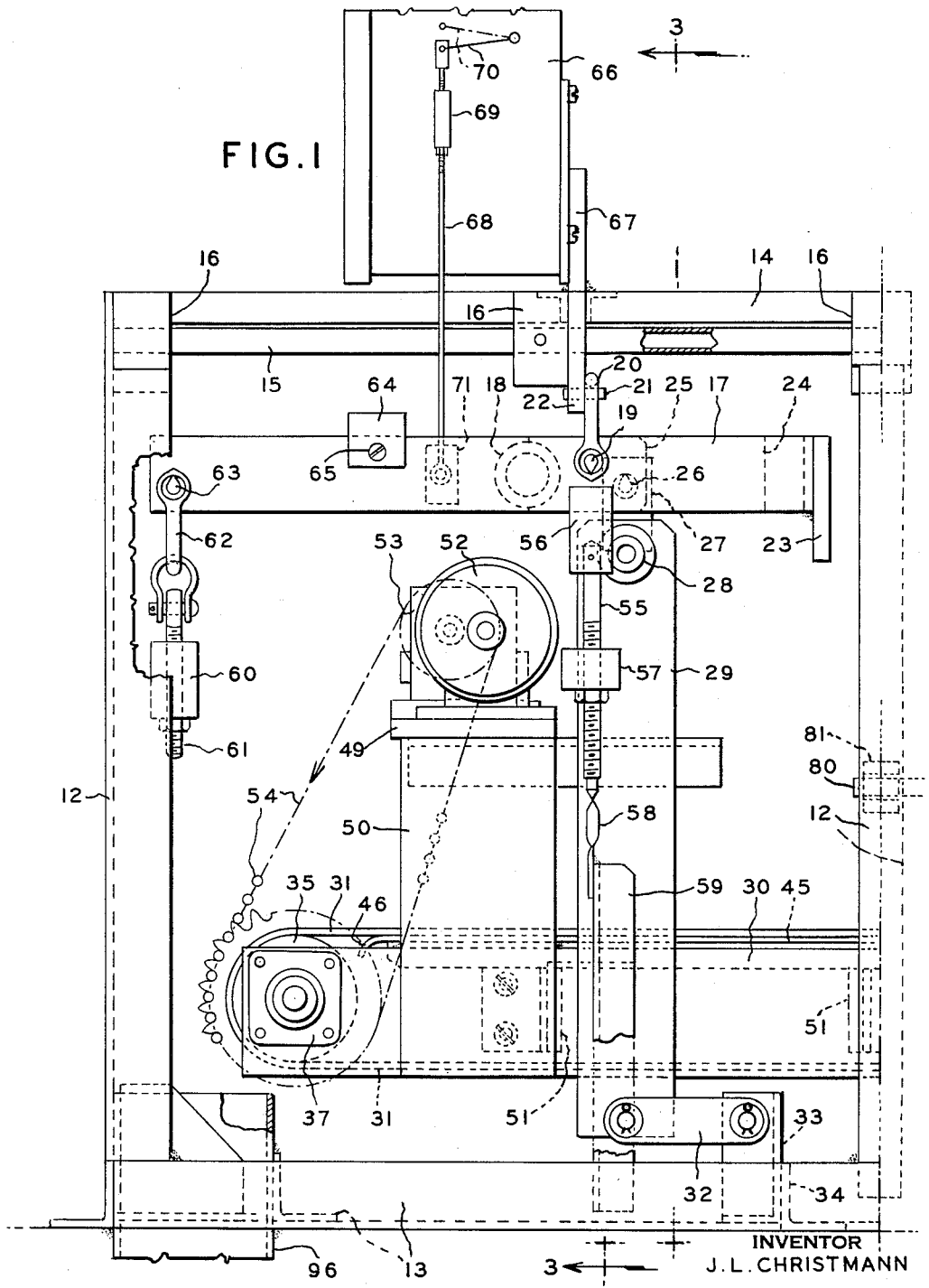
FIGURE 1 is an elevational view of the weigher portion of the invention including the material discharge portion of the conveyor belt.

The embodiment of the invention is supported in a supporting structure comprising vertical members 12 secured to and supported by base members 13. The upper ends of the vertical members 12 are braced and connected to each other by horizontal members 14 braced by tubular members 15 having the ends secured in circular members 16 secured to the vertical members 12 and the horizontal members 14.

The embodiment of the invention comprises a main lever in the form of a pair of beams 17 connected by a tubular member 18 and having knife edged pivots 19 extended from the opposite faces of each beam 17 intermediate the ends of said beams. Clevises 20 are suspended from pins 21 fixed in and extended from a transverse member 22 of the supporting structure. The extremities of the leg portions of the clevises 20 are pivotally mounted on the pivots 19, as shown in FIGURES 1, 3 and 8. The beams 17 are connected to each other by a transverse member 23 secured to a corresponding end of each beam by angle brackets 24, as shown in FIGURES 1 and 8. The tubular member 18 is provided with laterally extending arms 25, each arm being arranged with knife edged pivots 26 extended from the opposite sides of said arm for the pivotal engagement of two pairs of arms 27 extended upwardly from a transverse tubular member 28.

A suspension member in the form of a plate 29 is mounted at the upper end portion on each end portion of the transverse tubular member 28 with the lower portion of each plate 29 secured to each side member or stringer 30 of a frame for supporting an endless conveyor belt 31. The stringers 30 are maintained in spaced relation to each other by transverse members 51 secured at their opposite ends to the insides of the stringers 30, as shown in FIGURE 7. To prevent longitudinal movement of the conveyor belt supporting frame, the suspension plates 29 are extended below the stringers 30 and a drag-link 32 is pivotally supported by a bracket 33 secured to a transverse member 34 of the base members 13 of the supporting structure and each drag-link is pivotally connected to each of the extended ends of the suspension plates 29.

Figure 2:
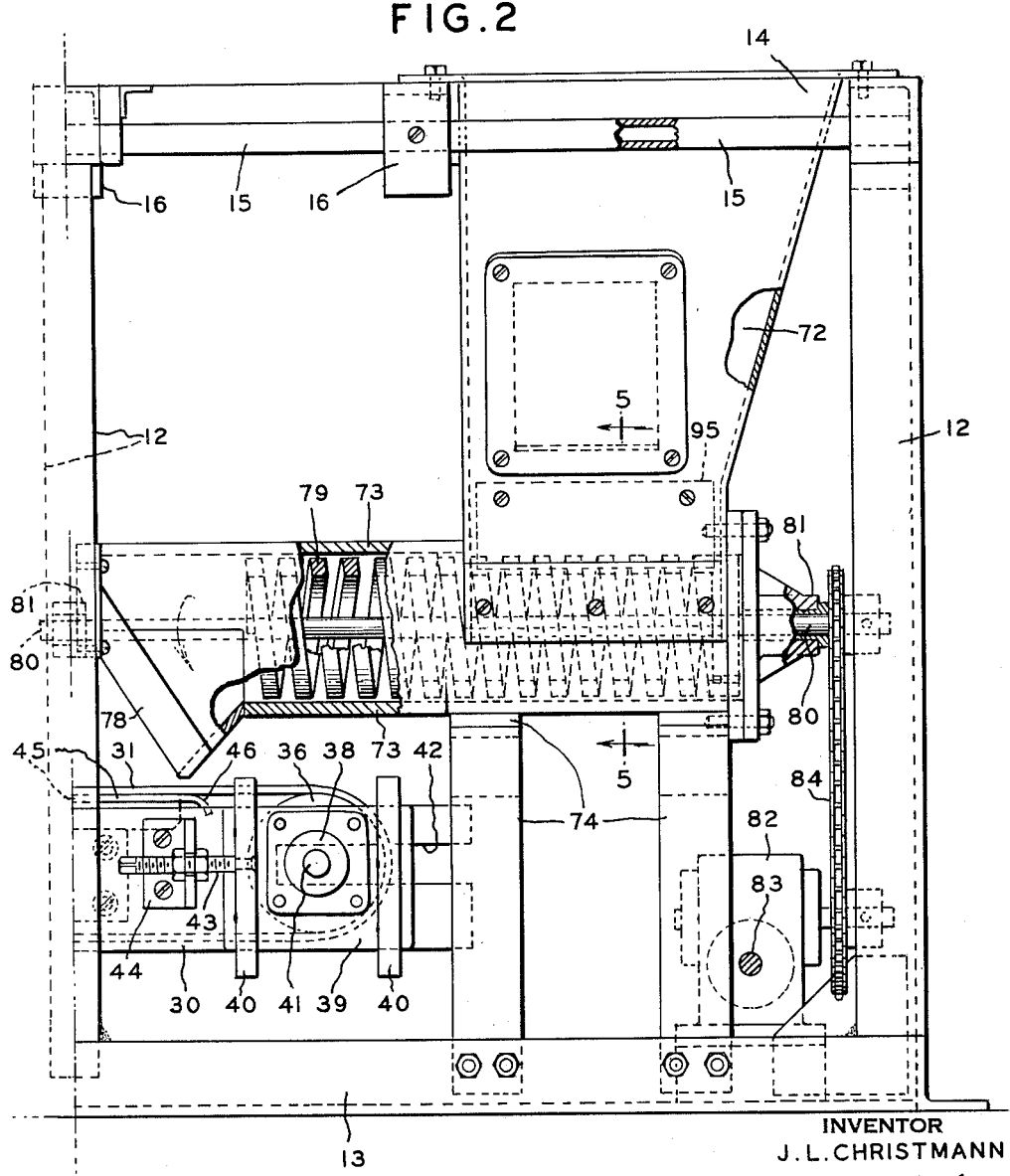
FIGURE 2 is an elevational view of the feeder portion of the invention including the material receiving portion of the conveyor belt.

The conveyor belt 31 is engaged around pulleys 35 and 36, the pulley 35 being the head pulley and rotatably supported in bearings 37 mounted on an end portion of each stringer 30. The pulley 36 is the tail pulley and is supported in bearings 38, each bearing 38 being carried by a plate 39 having two pairs of ears 40 slidable on the upper and lower edges of the stringers 30. The end portions of a shaft 41 of the pulley 36 are extended through bifurcations 42 in the ends of the stringers 30 opposite the ends supporting the bearings 37 to permit adjustment of the bearings 38 longitudinally of the stringers 30, as shown in FIGURE 2. The bearings 38 are adjusted to provide sufficient tension on the conveyor belt 31 to prevent slippage by adjustment screws 43, the intermediate portion of each screw being adjustably supported in a bracket 44 mounted on the outside of each stringer 30 and one end of said screw being rotatably connected to each plate 39, as shown in FIGURES 2, 6 and 7.

The upper stretch of the conveyor belt 31 is supported by a plate 45 having the opposite end portions curved downwardly, as at 46 in FIGURES 1 and 2, and the length of said plate 45 is less than the distance between the pulleys 35 and 36 so that the curved ends 46 terminate short of said pulleys 35 and 36. The plate 45 is supported at its opposite side portions by angle brackets 47 secured to the insides of the stringers 30, as shown in FIGURE 3. The material is retained on the upper stretch of the conveyor belt 31 by skirt boards 48 suspended from a platform 49 supported on the upper ends of a pair of standards 50, each standard being mounted at its lower end portion on the outside of each stringer 30.

The conveyor belt 31 is driven at a constant speed by a synchronous electric motor 52 mounted on the platform 49 and operatively connected to a speed reducer 53 mounted on said platform 49 and operatively connected by a sprocket chain 54 to the shaft of the pulley 35, as shown in FIGURES 1 and 3.

When the conveyor belt 31 is suspended from the main lever through the transverse member 28 and the suspension plates 29, the main lever acts as a load sensing element by the use of a pendulum and an adjustable weight comprising a rod 55 secured at its upper end in a bracket 56 secured to the bottom edge of one of the beams 17 in vertical alignment with the pin 21 from which said beam 17 is suspended, as shown in FIGURES 1 and 3. The pendulum rod 55 is provided with a screw threaded portion on which a ring shaped weight 57 is adjustably mounted. The lower end of the pendulum rod 55 is pointed to cooperate with an index member 58 supported by a bracket 59 mounted on one of the base members 13 of the supporting structure, whereby plumbness of the pendulum rod 55 is readily ascertained.

The beam 17 from which the pendulum rod 55 is suspended is counter-balanced by a weight 60 adjustably mounted on a screw-threaded bolt 61 pivotally suspended from a clevis 62 mounted on knife edged pivots 63 extended from the opposite sides of the end portion of said beam opposite the end portion provided with the transverse member 23.

The beam 17, which is provided with the pendulum rod 55 and the counter-balance weight 60, is also provided with a weight 64 slidably mounted on said beam 17 and retained in adjusted position by a set-screw 65, as shown in FIGURE 1.

The beam 17, which is provided with the pendulum rod 55, the counter-balance weight 60 and the slidable weight 64, is operatively connected to integrating mechanism, not shown, housed in a casing 66 mounted by a bracket 67 on the members 14 and 15 of the supporting structure, as shown in FIGURES 1 and 3. The operative connection between the beam 17 and the integrating mechanism comprises a rod 68 having an adjustable member 69 at the upper end pivotally connected to a lever 70 operatively connected to the integrating mechanism, and the lower end of the rod 68 pivotally connected to a lateral extension 71 of the beam 17, as shown in FIGURES 1 and 3.

Material to be weighed is delivered to a surge hopper 72 suspended from the members 14 of the supporting structure, as shown in FIGURES 2 and 4. The material is discharged from the hopper 72 to the end portion of the conveyor belt 31 supported by the pulley 36 by a feeder comprising a tubular housing 73 supported by a member 12 of the supporting structure and brackets 74 mounted on members 13 of the supporting structure. The housing 73 is provided with an opening in an upper circumferential portion and at one of the housing in communication with a discharge opening of the hopper 72, as indicated at 75 in FIGURE 5. The opposite end of the housing 73 is provided with a chute 78 for discharging the material onto the conveyor belt 31. The discharge of the material from the hopper 72 into the housing 73 is facilitated by a baffle 95 mounted in the hopper, as shown in FIGURE 5. The material is moved in the housing 73 from the opening 75 to the chute 78 by a spiral 79 mounted on a shaft 80 rotatably supported at the ends in bearings 81 mounted on the housing 73. The shaft 80 is driven from a speed reducer 82 mounted on the frame members 13 and connected to an electric motor shaft 83. A sprocket chain 84 is operatively connected to the shaft 80 and the speed reducer 82. The feed of the material from the hopper 72 to the conveyor belt 31 is regulated by the speed of rotation of the spiral 79.

Since the conveyor belt 31 is driven at a constant speed, the depth of load of material between the skirt boards 48 will vary with the speed of rotation of the spiral 79. In the present invention, this depth is limited to a maximum of one and one-half inches at six thousand pounds per hour and will decrease to near zero for low rates of feed such as twenty pounds to one hundred pounds per hour. As the depth of load increases, the starting point of the break-off of material at the pulley 35 will recede progressively until at one and one-half inches depth of material the break-off will be back of the center line of the shaft of the pulley 35 for dry material. This will cause a progressively larger minus error. When moist material is fed and weighed, the angle of repose may increase sharply to a point where a deep load of material may overhang and break-off in chunks which may cause a positive error.

Therefore it is important to stabilize the break-off so that it occurs as uniformly as possible. This is accomplished by a baffle 85, as shown in FIGURES 9 to 11, inclusive, of light sheet metal having one end portion curved downwardly, as at 86, and the opposite end portion bent upwardly at an obtuse angle, as at 87. The baffle 85 is pivotally supported from the skirt boards 48 by a pair of straps 88, each strap being secured at one end to the baffle 85 forwardly of the end 87 and the opposite end of each strap being coiled at 89 around a shaft 90 mounted at the opposite ends in each of the skirt boards 48. The curved end 86 of the baffle 85 is positioned slightly forwardly of shaft of the pulley 35 and provided with a curtain of flexible material, such as ladder chains 91 having their upper ends pivoted on a rod 92 supported above the curved end 86 of the baffle 85 by engaging the opposite ends of said rod in ears 93 extended upwardly from said curved end 86. The weight of the chains 91 will cause the baffle to rest on the material, as shown in FIGURE 9, and the free ends of the chains 91 will extend over the bight of the conveyor belt 31 to hold the material back just sufficiently to cause a uniform break-off for any depth of load. Downward movement of the baffle 85 is limited by stop pins 94 extended inwardly from the skirt boards 48 to engage the underface of the baffle 85.

The material is discharged from the conveyor belt 31 into a chute 96 supported by the supporting structure members 13 and leading to a place of disposal, not shown.

Having thus described my invention, I claim:

1. In a weighing conveyor, a supporting structure, a pair of beams pivotally supported intermediate their ends from the supporting structure, a tube secured at its opposite ends to the beams to extend transversely of said beams, a member pivotally supported by said tube to extend in a parallel plane below said beams and tube, a suspension member mounted its upper end on each end portion of the pivotal member, a frame secured intermediate its ends to and between the suspension members, and an endless belt conveyor supported by the frame and having a material receiving portion and a material discharging portion, whereby the frame and the endless belt conveyor are entirely suspended from the pair of beams to reduce vertical deflection.

2. In a weighing conveyor as claimed in claim 1, a pendulum suspended from one of the beams, a weight adjustably mounted on said pendulum, and an index member fixedly mounted in vertical alignment with and below the pendulum when the beam is in balance with no load on the conveyor.

3. A weighing conveyor as claimed in claim 2, wherein the pendulum is suspended from the beam in vertical alignment with the pivotal support of the beam.

4. In a weighing conveyor as claimed in claim 3, a weight pivotally suspended from the beam provided with the pendulum to counter-balance said beam and position the pendulum in vertical alignment with the index member.

5. In a weighing conveyor as claimed in claim 1, skirt boards supported by the endless belt conveyor supporting frame and extended along the sides of the endless belt conveyor, a baffle pivotally mounted at one end on the skirt boards to extend over the material on the material discharging portion of the endless belt conveyor, and a curtain of flexible material mounted on the end of the baffle opposite the pivotal mounted end of the baffle to provide uniformity in the discharge of material from the endless belt conveyor and prevent error in the deflection of the beams.

6. A weighing conveyor as claimed in claim 5, wherein the curtain of flexible material comprises ladder chains.

7. A weighing conveyor as claimed in claim 5, wherein the end portion of the baffle adjacent the curtain of flexible material is curved in a downward direction.

8. In a weighing conveyor as claimed in claim 5, abutments extended from the skirt boards over the endless belt conveyor and below the baffle to limit the movement of the baffle toward the endless belt conveyor.

References Cited by the Examiner

UNITED STATES PATENTS

| 1,654,407 | 12/1927 | Boulogne | 177—16 |
| 2,340,030 | 1/1944 | Weyandt | 198—39 X |
| 2,533,710 | 12/1950 | Biehler | 177—16 X |
| 2,727,733 | 12/1955 | Carswell | 226—95 |
| 2,925,261 | 2/1960 | John | 198—39 |

FOREIGN PATENTS

| 1,265,359 | 5/1961 | France. |
| 622,241 | 11/1935 | Germany. |
| 47,982 | 3/1940 | Netherlands. |

LEO SMILOW, *Primary Examiner.*